C. WARING.
SLICER.
APPLICATION FILED SEPT. 10, 1915.
1,178,363.
Patented Apr. 4, 1916.
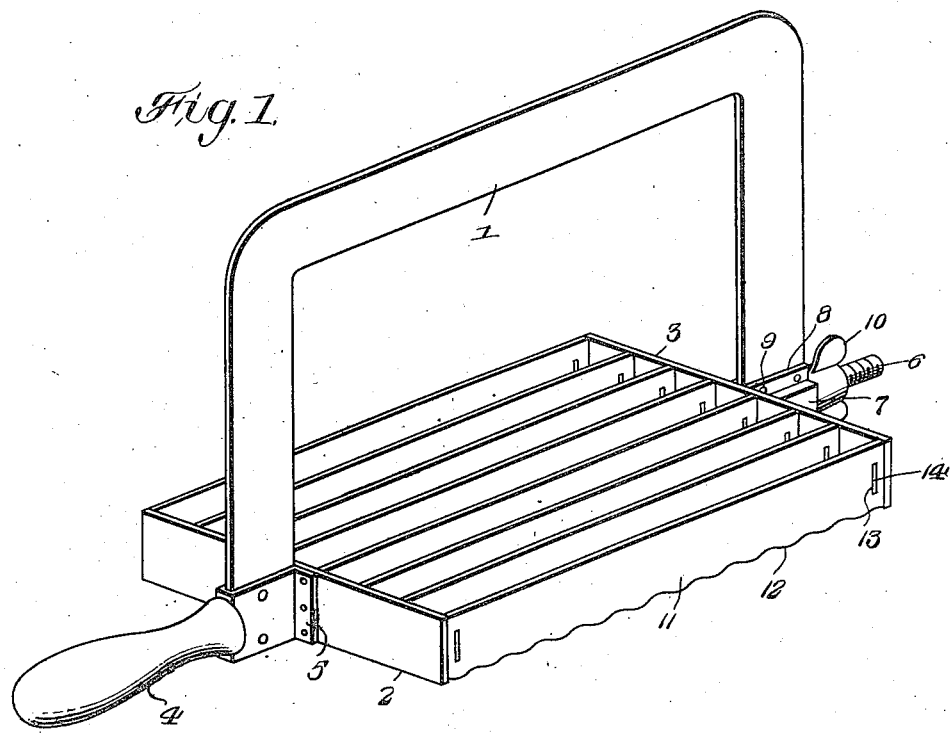
Fig. 1.
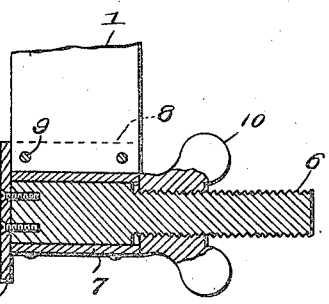
Fig. 2.
Fig. 3.
Inventor
Charles Waring,
Witnesses
J. H. Crawford
J. W. Garner
By Victor J. Evans
Attorney

UNITED STATES PATENT OFFICE.

CHARLES WARING, OF OLDS, ALBERTA, CANADA, ASSIGNOR OF ONE-HALF TO JOHN DOUGLAS HAZELTON, OF OLDS, ALBERTA, CANADA.

SLICER.

1,178,363.      Specification of Letters Patent.      Patented Apr. 4, 1916.

Application filed September 10, 1915. Serial No. 50,068.

*To all whom it may concern:*

Be it known that I, CHARLES WARING, a subject of the King of Great Britain, residing at Olds, in the Province of Alberta and Dominion of Canada, have invented new and useful Improvements in Slicers, of which the following is a specification.

This invention is an improved slicer, for cutting bread and other like material into slices of uniform width and at a single operation, the object of the invention being to provide an improved implement of this kind which is extremely cheap and simple, is strong and durable, and by means of which a number of slices of uniform width may be simultaneously cut from a loaf of bread or the like.

The invention consists in the construction, combination and arrangement of devices hereinafter described and claimed.

In the accompanying drawings: Figure 1 is a perspective view of a slicer constructed in accordance with my invention, Figs. 2 and 3 are sectional views of the same.

The frame of my improved slicer comprises a longitudinal bar 1 and a pair of transversely arranged end bars 2—3. The bar 1 is arched or of inverted U-shape so as to extend above and to clear a loaf of bread or the like. The end bar 2 is secured at its center to a clip 5. One end of the arched bar is secured in said clip and a handle 4 is also attached to said clip as shown.

The rear end bar 3 corresponds in size and shape with the front bar 2 and is connected by a bolt 6 to a guide clip 8 which is secured on the other end of the arched bar, that portion of the bolt which is arranged in the guide of the clip being square as at 7 and the guide portion of the clip being correspondingly shaped. A winged adjusting nut 10 is screwed on the bolt 6 and bears against the rear sides of the guide 8 and rear arm of the longitudinal bar and coacts with the bolt 6 in adjusting the rear end bar 3 toward and from the front end bar 2. I also provide a number of blades 11 which are made of steel and are preferably very thin and are provided with undulating lower cutting edges 12. Each blade has openings 13 near its ends forming vertical slots and which are engaged by correspondingly shaped hooks 14 which connect the ends of the blade to the end bars of the frame and which hooks are in practice preferably made of sheet metal.

A suitable number of the blades are provided and they are suitably spaced apart according to the desired width of the slicers and the length of the end bars. The bolt and nut enable the rear end bar to be adjusted to tighten the blades and keep them under the requisite tension and to also enable the blades to be attached and detached at will.

It will be understood that a number of slices may be cut from a loaf of bread or other like material at a single operation of the implement which is wielded like an ordinary knife.

While I have herein shown and described a preferred form of my invention I would have it understood that changes may be made in the form, proportion and construction of the several parts without departing from the spirit of the invention and within the scope of the appended claim.

Having thus described my invention I claim:—

The herein described slicer comprising an arched longitudinally arranged bar, clips secured to the ends of said arched bar, one of said clips having a guide portion, a transversely arranged bar having its central portion secured to the other clip, a handle also secured to the other clip, a transversely arranged bar provided with a bolt at its center, said bolt having a squared portion arranged in the guide of the first-named clip and being also provided with an adjacent nut bearing against the rear sides of said guide, and a plurality of spaced longitudinally arranged blades having their ends detachably connected to said transversely arranged bars.

In testimony whereof, I affix my signature in presence of two witnesses.

CHARLES WARING.

Witnesses:
J. D. HAZELTON,
E. MARGARET DOMING.